Jan. 2, 1945.　　　　　L. W. THOMPSON　　　　2,366,577
ELECTRIC REGULATING AND CONTROL SYSTEM
Filed May 26, 1942

Inventor:
Louis W. Thompson,
by Harry E. Dunham
His Attorney.

Patented Jan. 2, 1945

2,366,577

UNITED STATES PATENT OFFICE 2,366,577

ELECTRIC REGULATING AND CONTROL SYSTEM

Louis W. Thompson, Schenectady, N. Y., assignor to General Electric Company, a corporation of New York Application May 26, 1942, Serial No. 444,511

10 Claims. (Cl. 171—119)

My invention relates to electric regulating and control systems and more particularly to improvements in electric regulating systems including anti-hunting control means.

This is a continuation-in-part of my application Serial No. 422,536, filed December 11, 1941 and assigned to the present assignee.

Regulator systems having a time lag between a change in a controlling influence and the resulting change in a controlling action have an inherent tendency to overshoot or hunt so that although the regulated quantity may have the desired average value it is subject to fluctuations of such magnitude as to be unsatisfactory. Various arrangements have been provided for minimizing the hunting action of regulators but many of these have been complicated or have failed to reduce the hunting action as much as desired. In accordance with an important feature of my invention I provide an improved control circuit which is simple, effective and particularly well adapted for anti-hunting purposes and which operates by inserting a controlling influence in an alternating current control circuit in response to a rate of change of a direct current quantity.

It is an object of my invention to provide a new and improved electrical control system.

It is another object of my invention to provide a new and improved electrical regulating system including an improved anti-hunting circuit.

It is still another object of my invention to provide a new and improved electrical regulating system including an improved anti-hunting circuit for modifying an alternating current control voltage in response to a rate of change of a direct current quantity.

My invention will be better understood by reference to the following description taken in connection with the accompanying drawing and its scope will be pointed out in the appended claims.

Figure 1:
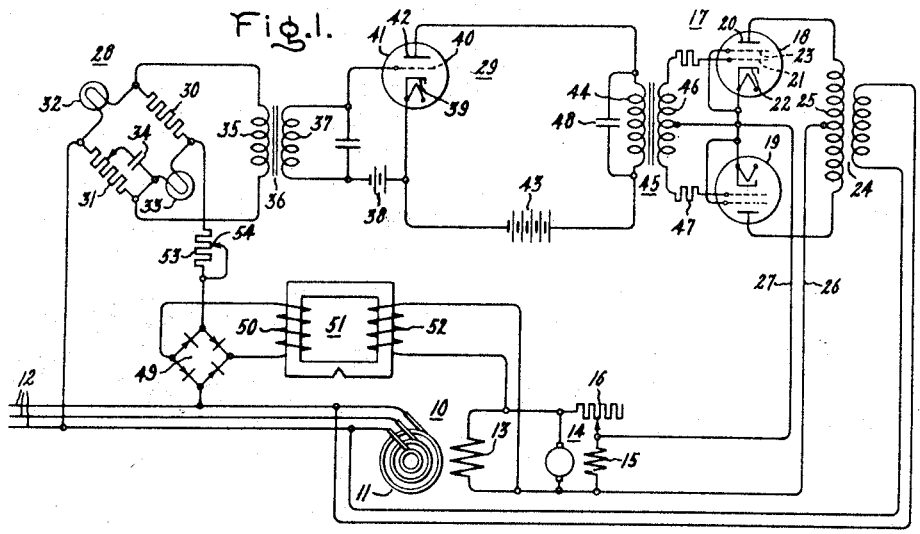
Figure 2:
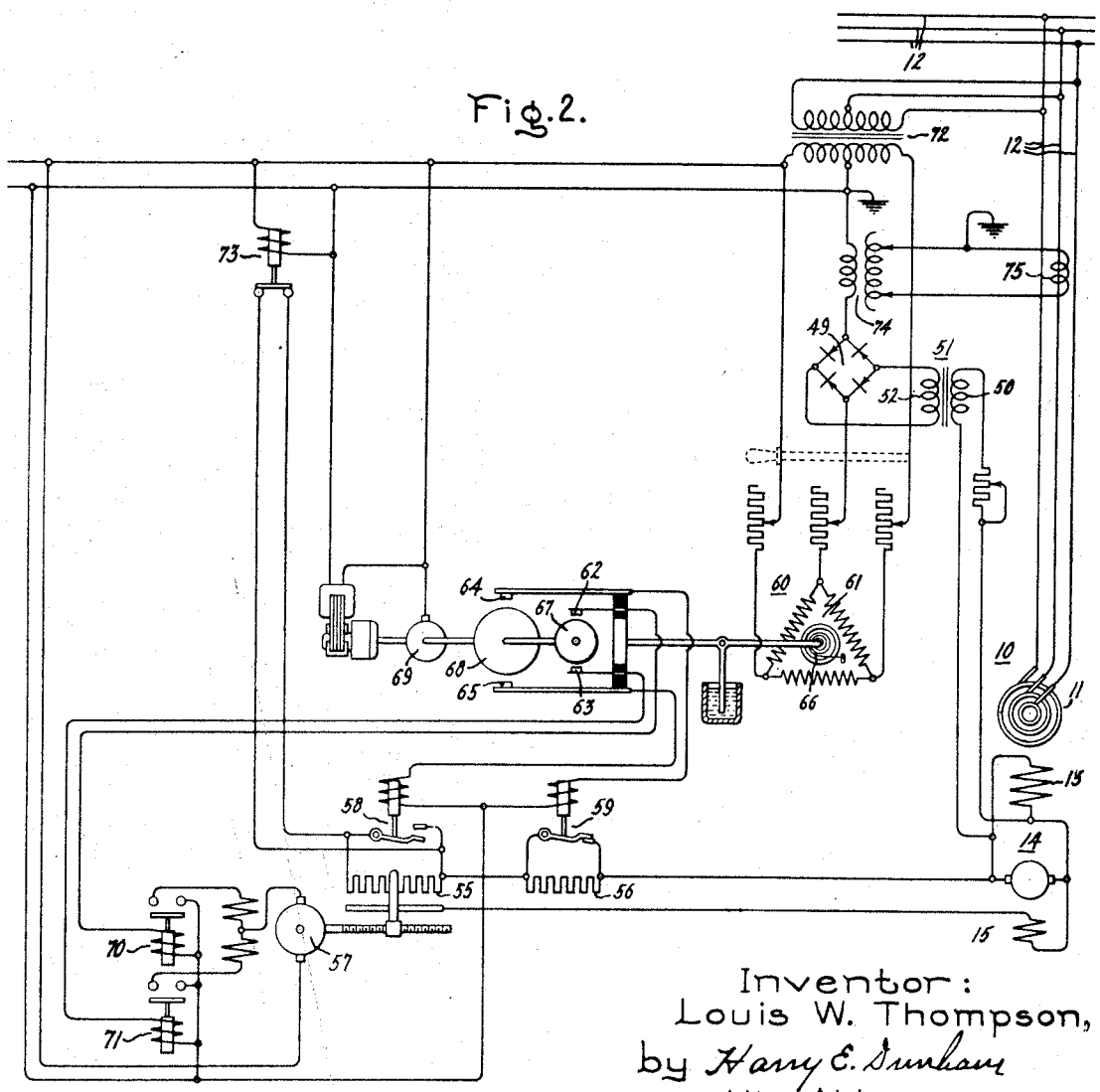

In the drawing Fig. 1 illustrates diagrammatically an embodiment of the invention as applied to a vacuum tube type automatic voltage regulator and Fig. 2 illustrates a modification in which the invention is used in connection with an indirect-acting rheostatic type voltage regulator.

Referring generally to Fig. 1, I provide a regulating system for an alternator and associated exciter in which the field winding of the exciter is energized in accordance with the current conducted by a pair of electric discharge valves. The conductivities of the electric discharge valves are controlled by a voltage responsive bridge having the input circuit thereof connected to respond to the output voltage of the alternator. The output voltage of the alternator is modified in accordance with an anti-hunting voltage before it is impressed on the voltage responsive bridge by means of a rectifier bridge having the direct current terminals thereof connected to one winding of an anti-hunting or stabilizing transformer which has the other winding thereof energized in accordance with the direct current voltage impressed on the field winding of the alternator by the exciter. In this manner, rate of change of direct current voltage of the exciter induces a voltage in the transformer which modifies the impedance of the rectifier bridge to the flow of alternating current in accordance with the direction and rate of change of the exciter voltage. In this manner the voltage impressed on the input circuit of the bridge is modified in accordance with the rate of change of the exciter voltage.

Referring now to the details of Fig. 1, I have shown my invention embodied in a regulating system for maintaining the output of an alternating current dynamo-electric machine, such as a generator 10, at a desired value. The alternating current generator 10 has the armature 11 connected to supply a three-phase alternating current circuit 12. The alternator also includes a field winding 13 connected to the armature terminals of an exciter 14. Excitation of the exciter 14 is provided by a field winding 15 connected in series with an adjustable resistance element 16 and across the terminals of the exciter 14. The field winding 15 is also connected in the direct current circuit of a full wave electric valve rectifier circuit illustrated generally by the numeral 17 and comprising electric valve means 18 and 19, preferably, each of the type comprising an envelope enclosing an ionizable medium such as a gas or vapor and an anode 20, a control member or grid 21 and cathode 22. Each of the electric valve means is also provided with a shield grid 23. The anode-cathode circuits of the electric valve means 18 and 19 are energized from one phase of the circuit 12 by means of a transformer 24 having a midtapped secondary winding 25. As is well understood the direct current circuit of the full-wave rectifier comprising valves 18 and 19 is connected between the midtap of winding 25 and the cathodes of the two valves which are electrically connected together. As illustrated in the drawing, one terminal of the field winding 15 of exciter 14 is connected to the midpoint of transformer secondary winding 25 by a conductor 26 and the other terminal of the field winding is connected to the cathodes of the electric valves 18, 19 by a conductor 27.

In order that the excitation of the exciter 14 and as a result the excitation of the alternator 10 may be controlled in accordance with the voltage or other electrical condition of the circuit 12, the control members 21 of the valves 18 and 19 are energized in accordance with the electrical condition of the circuit 12 to be regulated and in the particular arrangement illustrated in accordance with the voltage of the circuit 12. Referring to the drawing, the control members 21 of electric valves 18 and 19 are energized in accordance with the output of a voltage responsive bridge circuit 28 after it has been amplified by an electric valve amplifier circuit 29. The bridge circuit 28 is provided with alternate arms 30 and 31 comprising linear resistances and the alternate arms 32 and 33 comprising resistance elements having a temperature sensitive resistance characteristic and may be in the form of tungsten filament enclosed in a hydrogen filled envelope. A condenser 34 having a variable tap shunting a portion of the resistance arm 31 is provided to modify the output of the bridge circuit. Diagonally opposite terminals of the bridge are connected across one phase of the circuit 12 while the other diagonally opposite terminals of the bridge are connected to energize the primary winding 35 of a transformer 36. The secondary winding 37 of the transformer 36 is connected in series with a source of direct current potential 38 and between the cathode 39 and control member 40 of an electric valve 41. The valve 41 also includes an anode 42. The anode-cathode circuit of the valve 41 includes a source of direct current voltage 43 and the primary winding 44 of a transformer 45 having a midtapped secondary winding 46 connected to energize the control members 21 of electric valve rectifier 17. The end terminals of the winding 46 are connected to the control members 21 through current limiting resistors 47 and the midtap of the transformer secondary winding 46 is connected to the cathodes of the electric valves 18 and 19. Suitable filter capacitors 48 are connected across transformer windings 37 and 44 to eliminate harmonics from the control voltage impressed on control members 21. It is apparent from the foregoing description that the output voltage of the bridge circuit is amplified by means of valve 41 and impressed on the transformer 45 to control the conductivities of the electric valves 18 and 19.

In order to prevent the voltage of the alternator 10 from fluctuating about a mean value due to overshooting of the regulator circuit, I provide improved means for modifying the operation of the control circuit for the electric valves 18 and 19 in accordance with the rate of change of voltage of the exciter 14. As illustrated in the drawing, a rectifier bridge 49 preferably comprising units of the dry or contact type is connected in series with one of the input terminals of the voltage responsive bridge 28. The direct current terminals of the bridge are connected to the secondary winding 50 of a stabilizing transformer 51 having the primary winding 52 thereof connected across the terminals of exciter 14. In this way a voltage is induced in winding 50 proportional to the rate of change of direct current voltage across the terminals of exciter 14. This voltage across the winding 50 impedes the flow of alternating current through the rectifier bridge and in this way effectively varies the alternating current impedance of the rectifier bridge in accordance with the rate of change of exciter voltage. A resistor 53 having a variable tap 54 included in series with the rectifier bridge provides means for making an initial adjustment of the regulator system to determine the voltage which the regulator tends to maintain on the lines of the alternating current circuit 12.

A better understanding of the features and advantages of my invention may be had by a brief consideration of the operation of the illustrated embodiment described above. As is well understood, the voltage supplied to the alternating current circuit 12 by the alternator 10 may be controlled by controlling the energization of the field winding 15 of the exciter 14. In the illustrated embodiment this is accomplished by controlling the conductivity of the electric valves 18 and 19 which are connected as a full-wave rectifier and energized from the alternating current circuit 12 and controlled in accordance with the voltage of the circuit 12 by means of the voltage responsive bridge 28. The voltage responsive bridge 28 is of a type well known in the art and is usually considered to produce a voltage which varies in magnitude in response to variations in the magnitude of the alternating current voltage impressed thereon and which reverses in phase as the impressed voltage on the bridge circuit goes through a critical value for which the bridge is set. This output voltage is amplified by the amplifier circuit 29 and impressed on the control members 21 of the valves 18 and 19. The phase relation of the voltages impressed on the valves 18, 19 and the output voltage of the bridge circuit is such that the valves 18 and 19 are rendered fully conductive when the voltage of the circuit 12 is below that for which the bridge is set. When the voltage rises above the value for which the bridge is set, the phase of the output voltage of the bridge circuit 28 reverses and the valves 18, 19 are rendered nonconducting. In other words, the regulator system works in a manner similar to a vibratory regulator in which the voltage rapidly fluctuates about the value which it is desired to maintain. If desired, gradual variation in conductivity of electric valves 18 and 19 may be obtained if a bias voltage is employed in the circuit of control members 21.

Whether or not the valves are controlled in an on-off manner to operate the regulating system in the manner of a vibratory regulator or whether gradual change in the conductivity of the valves is effected by means of phase shift of the excitation potentials applied to the members 21 is not important to the present invention which relates primarily to the improved anti-hunting circuit for modifying the alternating current voltage of the circuit 12 before it is impressed on the voltage responsive circuit. As mentioned earlier in the description of the apparatus, rectifier bridge 49 is connected in circuit with one of the input terminals of the bridge 28 and has the direct current terminals thereof connected in circuit with the winding 50 of a transformer 52 connected across the terminals of the exciter 14. With this arrangement the voltage impressed on the bridge circuit departs from the voltage of the circuit 12 by an amount dependent upon the voltage drop across the rectifier bridge 49. As is well understood by those skilled in the art the effective alternating current impedance of the bridge may be varied by varying the magnitude of the direct current voltage across the direct current terminals of the bridge. The interposition of the transformer 51 between the terminals of the exciter 14 and the direct current terminals of the rectifier circuit 49 makes the variation of impedance of the device 49 responsive to the rate of change of voltage of the exciter 14 rather than directly responsive to the exciter voltage. The polarity of the exciter with respect to the direct current circuit of the bridge 49 is arranged so that when the direct current voltage of the exciter 14 is decreasing, the voltage induced in winding 15 opposes the flow of alternating current through the bridge 49 and in this way reduces the voltage impressed on the bridge with respect to the voltage of the alternating current circuit 12. In this way the change in voltage of the circuit 12 due to the rate of change of voltage of exciter 14 is anticipated and overshooting of the control system is minimized.

While I have shown my invention embodied in a circuit for controlling the output voltage of an alternator in accordance with the rate of change of the alternator exciter voltage, it will be apparent to those skilled in the art that it is equally suited for other types of control systems where speed or any other quantity is to be controlled or regulated.

In the modification shown in Fig. 2, the voltage of the generator 10 is regulated by means of an indirect-acting rheostatic voltage regulator of the type described and claimed in my Patent 1,848,852, granted March 8, 1932 and assigned to the assignee of the present application. This comprises two resistors 55 and 56 connected in series with the field winding 15 of the exciter. The resistance 55 is varied by means of a servo motor 57 so that these two elements constitute a motor-operated rheostat. The resistor 56 is a fixed resistor. For normally short circuiting the resistor 56 there is provided a so-called high speed lowering relay 58 and for short circuiting the active portion of the rheostatic resistance 55 there is provided a normally open so-called high speed raise contactor 59. The motor and the two high speed relays are controlled in response to the voltage of the main generator by means of a regulator head 60 comprising a primary control device in the form of a three-phase torque motor 61. This torque motor carries a spring contact assembly comprising low speed raise contact 62, low speed lower contact 63, high speed raise contact 64 and high speed lower contact 65. The torque of the motor is balanced by a spring 66 so that when the regulated quantity is normal the low speed contacts are substantially equally spaced from a smooth-surfaced rotating common contact 67 and the high speed contacts are similarly substantially equally spaced from a smooth-surfaced rotating common contact 68. These rotating contacts are mounted on a common shaft driven by any suitable means, such as a motor 69.

As it is usually undesirable to have the regulator contacts control directly the current of the motor 57, auxiliary so-called low speed raise and lower relays 70 and 71 are connected respectively in circuit with the contacts 62 and 63.

The torque motor is energized in accordance with the voltage of the main alternator 10 by means of an open-delta-connected potential transformer 72.

The alternating current terminals of the bridge-connected rectifier 49 of the anti-hunting control system are connected in series with one of the phases of the phase conductors of the torque motor 61.

In a number of cases there is no convenient source of auxiliary current supply available for operating the high and low speed contactors, the servo motor 57 or the motor 69 for driving the common contacts of the regulator head. These devices are therefore energized from the exciter 14, although it should, of course, be understood that they could be energized from the main generator if desired. In order to insure self-starting of the system in case it has been shut down there is provided a relay 73 connected to respond to the voltage of the main generator and having a normally open set of contacts which are arranged to short circuit the resistance 55 when the main generator voltage is below a predetermined value.

For controlling the regulator in response to watt-less currents in the generator, such as circulating currents which flow in the case of parallel-connected generators whose voltages are not exactly equal, there is provided a reactance transformer 74 connected in one of the lines of the torque motor 61. This is energized in proportion to the current in the corresponding line of the alternator by means of a current transformer 75.

The operation of Fig. 2 is as follows: With the voltage of the main generator at its normal value, the contacts of the regulator head will all be disengaged, as shown in the drawing, and the relay 73 will be picked up. Small changes in voltage of the generator occurring for any reason will cause the torque motor to respond so as to make either the raise or the lower contact, as the case may be, engage the common contact 67. This will energize either the relay 70 or the relay 71, thereby to cause the motor 57 to drive the rheostat in the proper direction to restore the voltage to normal. If the change is a relative large one, the high speed raise or lower contact, as the case may be, will engage its cooperating common contact 68, thereby to energize the corresponding high speed contactor in which case either the entire resistance 55 will be short circuited so as to cause quick increase in the excitation and hence the voltage or else the normally short circuited resistor 56 will have the short circuit removed so as to cause rapid decrease in the excitation and voltage of the main machine. The moving or rotating surfaces of the contacts 67 and 68 give a polishing action of the contacts which insures an extra long life.

The anti-hunting action is essentially the same as in Fig. 1 in that whenever there is a change in voltage of the exciter 14, a voltage will be induced in the secondary winding 52 of the stabilizing transformer which has the effect of changing the effective impedance between the direct current terminals of the rectifier 49 and hence it changes the effective impedance between the alternating current terminals of the rectifier. In this manner the effective energization of the torque motor 61 is varied in such a manner as to counteract the action of the regulator and prevent overshooting or hunting.

For best operation of this control system the time duration of the transient unidirectional voltage induced in winding 52 should be long compared to the period of a cycle of the main circuit 12. This will always be true for a sixty cycle per second generator having a conventional excitation system.

An example of a situation where no source of auxiliary current supply is available for operating the regulator motor and its contactors is where the generator 10 is itself the source of auxiliary supply current in a station or on a ship. Under these conditions it is imperative that the exciter 14 and the generator 10 build up voltage whenever they are started from rest. It has been found, however, that in some instances the motor-operated rheostat has been run to its maximum resistance position before the system had previously been shut down so that when it is restarted the field resistance is so high that self-excited voltage build-up cannot take place and consequently the regulator can never act and no voltage will be produced. In order to prevent this the relay 13 is set to maintain its contacts closed at values of voltage below a certain percentage of normal voltage, such for example as eighty per cent of normal voltage. Consequently, whenever the system is shut down the relay 13 short circuits the entire motor-operated rheostat so that there will always be a relatively low resistance in the field circuit of the exciter when it is started from rest. It will, therefore, build up voltage so that the regulator can cause the motor 57 to operate to lower the resistance of the rheostat and can also cause the high speed raise contactor to short circuit the motor-operated rheostat. Consequently, by the time eighty per cent voltage is reached and the relay 13 opens, the regulator will have taken over control.

The voltage of the reactance transformer 14 is proportional to the current of the alternator 10 and is substantially in quadrature with the particular phase current to which it responds. Therefore, at unity power factor on the alternator 10 this voltage will be substantially in quadrature with the voltage of the conductor (supplying the torque motor) in which it is inserted. The magnitude of the voltage of the transformer 14 is small compared to the magnitude of the voltage of this conductor so that it has negligible effect on the regulator under these conditions. However, with respect to circulating currents which have a very low power factor and which either lead or lag, depending upon whether the voltage of alternator 10 is below or above other machines with which it may be paralleled, the voltage of the transformer 14 will shift its phase so as either to add or subtract from the phase voltage of the torque motor energizing conductor. In this manner the regulator is biased to raise or lower the voltage so as to minimize circulating currents.

While there has been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. An electric regulating system for a dynamo-electric machine having a direct current excitation circuit comprising a regulator for controlling the energization of said direct current excitation circuit, means for energizing said regulator in accordance with an operating condition of said machine comprising a control circuit having an alternating current voltage which is dependent upon said operating condition, impedance means which is separate from said regulator connected in said control circuit, and means responsive to an electrical condition of said excitation circuit for modifying the effective magnitude of said impedance in a manner to prevent hunting of said regulating system.

2. An electric regulating system for a dynamo-electric machine having a direct current excitation system comprising a regulator, means for controlling the operation of said regulator in accordance with an operating condition of said dynamo-electric machine including a circuit having an alternating voltage which is dependent upon variations in said condition, impedance means which is separate from said regulator connected in said circuit for modifying the effective value of said alternating current voltage, and means responsive to the rate of change of voltage of said direct current excitation circuit for modifying the effective magnitude of said impedance means in a manner to prevent hunting of said regulating system.

3. An electric regulating system for a dynamo-electric machine having a direct current excitation circuit comprising a regulator operable to produce a variable direct current voltage for energizing said excitation circuit, a control circuit having a variable alternating current voltage which is dependent upon an operating condition of said machine, means for impressing said alternating current voltage on said regulator, and means responsive to the rate of change of said variable direct current voltage for modifying the variable alternating current voltage impressed on said regulator to prevent hunting action of said regulating system.

4. An electric regulating system for apparatus having an operating condition to be controlled, a regulator for producing a variable direct current voltage for controlling said operating condition, a control circuit for producing a variable alternating current voltage in response to variations in said operating condition, and means responsive to the rate of change of said variable direct current voltage for modifying the effective value of said variable alternating current voltage to prevent hunting action of said regulating system.

5. An electric regulating system for apparatus having an operating condition to be controlled, a regulator for producing a variable direct current voltage for controlling said operating condition, a control system for controlling the magnitude of said direct current voltage comprising a control circuit responsive to said condition for producing a variable alternating current voltage, impedance means which is separate from said regulator connected in said control circuit, and means for modifying the effective magnitude of said impedance in accordance with changes in said direct current voltage to prevent hunting action of said regulating system.

6. An electric regulating system for apparatus having an operating condition to be controlled, a regulator for producing a variable direct current voltage for controlling said operating condition, a control system for controlling the magnitude of said direct current voltage comprising a control circuit responsive to said condition for producing a variable alternating current voltage, a rectifier bridge having the alternating current terminals connected in said control circuit, and means for impressing a voltage on the direct current terminals of said bridge dependent upon variations in said direct current voltage to vary the alternating current impedance of said bridge.

7. In an electric regulating system, a dynamo-electric machine having an excitation circuit, an automatic regulator for said machine comprising electric valve means having a control electrode for controlling the voltage of said excitation circuit, an alternating current control circuit energized in accordance with an output condition of said dynamo-electric machine and connected to energize the control member of said valve means to control the operation thereof in accordance with variations in said condition, impedance means which is separate from said regulator connected in circuit with said alternating current control circuit, and means for modifying the alternating current impedance value of said impedance means in accordance with the rate of change of direct current voltage of said excitation circuit to prevent hunting of said regulating system.

8. In combination, apparatus having an operating condition to be regulated, an automatic regulator therefor, said regulator having a main control circuit connected to be energized in accordance with an alternating voltage which is proportional to the value of said condition, a full-wave rectifier having alternating current terminals connected in series in said control circuit, said rectifier having a pair of direct current terminals, and anti-hunting means connected to said direct current terminals for varying the effective impedance therebetween in accordance with the activity of said regulator.

9. In combination, apparatus having an operating condition to be regulated, an automatic regulator therefor, said regulator having a primary controller in the form of a three-phase torque motor connected to be energized by a three-phase voltage which is proportional to the value of said condition, a full-wave rectifier having a pair of alternating current terminals connected in series with one of the terminals of said torque motor, said rectifier having a pair of direct current terminals, and anti-hunting means connected between said direct current terminals for effectively varying the impedance therebetween in accordance with the activity of said regulator.

10. In combination, a dynamo-electric generator, a shunt excited field winding the current in which controls the voltage of said generator, a motor-operated rheostat connected to control the current in said field winding, said rheostat having a high resistance position which prevents voltage build-up of said generator, a circuit energized by said generator for supplying operating current to said motor, an automatic regulator for said generator for controlling said circuit, and a relay responsive to the voltage of said generator for short circuiting said rheostat when the voltage of said generator is substantially below a predetermined normal value.

LOUIS W. THOMPSON.